United States Patent
Viegener

(10) Patent No.: US 8,042,841 B2
(45) Date of Patent: Oct. 25, 2011

(54) CONNECTION ELEMENT FOR PRODUCING A FLUID-TIGHT SCREW CONNECTION, AND METHOD FOR THE PRODUCTION THEREOF

(75) Inventor: Walter Viegener, Attendorn (DE)

(73) Assignee: Viega GmbH & Co. KG, Attendorn (DE)

( * ) Notice: Subject to any disclaimer, the term of this patent is extended or adjusted under 35 U.S.C. 154(b) by 615 days.

(21) Appl. No.: 11/997,252

(22) PCT Filed: Jul. 31, 2006

(86) PCT No.: PCT/EP2006/064872
§ 371 (c)(1),
(2), (4) Date: Jun. 18, 2008

(87) PCT Pub. No.: WO2007/012673
PCT Pub. Date: Feb. 1, 2007

(65) Prior Publication Data
US 2009/0123226 A1    May 14, 2009

(30) Foreign Application Priority Data
Jul. 29, 2005   (DE) .......................... 10 2005 036 343

(51) Int. Cl.
*F16L 19/00* (2006.01)
(52) U.S. Cl. ........................................ 285/333; 285/355
(58) Field of Classification Search ................... 285/333, 285/334, 355
See application file for complete search history.

(56) References Cited

U.S. PATENT DOCUMENTS

| | | | | |
|---|---|---|---|---|
| 1,832,713 A * | 11/1931 | Leinau | .......................... | 285/355 |
| 1,875,708 A * | 9/1932 | Couhig | .......................... | 285/355 |
| 2,928,446 A | 3/1960 | James et al. | | |
| 3,101,207 A | 8/1963 | Pavel et al. | | |
| 3,146,142 A * | 8/1964 | Maly | .......................... | 285/355 |
| 3,182,702 A | 5/1965 | Nason et al. | | |
| 3,322,446 A * | 5/1967 | Koziol et al. | .................. | 285/355 |
| 3,366,504 A * | 1/1968 | Hulterstrum | .................. | 285/355 |
| 3,653,675 A * | 4/1972 | Schaefer | ......................... | 285/355 |
| 3,687,493 A | 8/1972 | Locks et al. | .................. | 285/333 |
| 3,822,902 A * | 7/1974 | Maurer et al. | ................. | 285/333 |
| 4,682,797 A * | 7/1987 | Hildner | .......................... | 285/355 |
| 4,813,714 A * | 3/1989 | Fairey et al. | .................. | 285/355 |

(Continued)

FOREIGN PATENT DOCUMENTS

CH    557 499    12/1974

(Continued)

OTHER PUBLICATIONS

International Search Report for PCT/EP2006/064872.

*Primary Examiner* — David E Bochna
(74) *Attorney, Agent, or Firm* — Proskauer Rose LLP

(57) ABSTRACT

A connection element for producing a fluid-tight screw connection of a line, having a thread includes a thread groove, delimited by a thread base and neighboring thread flanks, a sealant situated in the thread groove at least over one complete revolution of the thread groove, and an adhesive bond being implemented between the sealant and the thread groove, wherein the sealant contains at least one material selected from the following group: silicones, fluoropolymers, in particular perfluoroalkoxypolymers, epoxide resins, and polyurethanes. The connection element can further be utilized in a pipe part and/or a valve.

43 Claims, 4 Drawing Sheets

U.S. PATENT DOCUMENTS

| | | | | |
|---|---|---|---|---|
| 4,872,914 A | * | 10/1989 | Howard | 285/355 |
| 4,969,671 A | | 11/1990 | Gross et al. | 285/333 |
| 5,106,130 A | * | 4/1992 | Ellsworth et al. | 285/355 |
| 5,234,765 A | * | 8/1993 | Taylor et al. | 285/355 |
| 6,361,083 B1 | * | 3/2002 | Riesselmann et al. | 285/333 |
| 6,679,526 B2 | * | 1/2004 | Yamamoto et al. | 285/355 |
| 7,350,830 B1 | * | 4/2008 | DeLange et al. | 285/334 |
| 7,571,936 B2 | * | 8/2009 | Schneider et al. | 285/333 |

FOREIGN PATENT DOCUMENTS

| | | |
|---|---|---|
| DE | 74 09 347 | 6/1974 |
| DE | 37 03 052 | 5/1988 |
| DE | 195 28 849 | 2/1997 |
| GB | 1 086 720 | 10/1967 |
| GB | 1 230 854 | 5/1971 |
| WO | 00/57070 | 9/2000 |
| WO | WO 00/57070 | 9/2000 |

* cited by examiner

CONNECTION ELEMENT FOR PRODUCING A FLUID-TIGHT SCREW CONNECTION, AND METHOD FOR THE PRODUCTION THEREOF

CROSS-REFERENCE TO RELATED APPLICATIONS

This application is a National Phase Application of International Application No. PCT/EP2006/064872, filed on Jul. 31, 2006, which claims the benefit of and priority to German patent application no. DE 10 2005 036 343.1-12, filed Jul. 29, 2005, which is owned by the assignee of the instant application. The disclosure of each of the above applications is incorporated herein by reference in their entirety.

TECHNICAL FIELD

The present invention relates to a connection element for producing a fluid-tight screw connection, having a thread, having a thread groove delimited by a thread base and adjacent thread flanks, having a sealant situated over at least one complete revolution of the thread groove, an adhesive bond being implemented between the sealant and the thread groove. Furthermore, the present invention relates to a pipe part for a fluid-tight pipeline having at least two attachment ends and a valve for a fluid-tight connection to at least one attachment end. Moreover, the present invention also relates to a method for producing a connection element.

BACKGROUND

Fluid-tight screw connections are necessary in manifold applications to prevent the escape of liquids or gases from a closed system. While flat seals or metallic sealing threads are partially used for this purpose, the use of thread seals is also frequently preferred in practice. The thread seals typically comprise hemp or Teflon and are wound around an external thread of the screw connection before the screwing together. The hemp fibers or the Teflon, which is used in the form of thin strips, reach the intermediate space between the external thread and the internal thread of the screw connection if correctly used and seal off this intermediate space in relation to a passage of gases or liquids.

The application of hemp or Teflon strips for sealing purposes is connected to a high time expenditure. In addition, even with extreme care, later leaks may not be precluded. Therefore, a connection element has been suggested in the prior art, whose external thread is coated using a polyamide layer. Thermoplastic sealants of this type, such as polyamide, have an array of disadvantages. One essential disadvantage is that the known sealants do not have permanent elasticity. The known sealants thus become brittle over time, so that they gradually lose their sealant properties. High temperatures or even large variations of the temperature, by which the sealant is alternately heated and cooled again, also favor the embrittlement of the sealant and thus the occurrence of leaks.

A further disadvantage affecting thermoplastic sealants in particular is that they are only usable up to a temperature of approximately 70° C. to 100° C. This temperature range is approximately coincident with the maximum permissible operating temperature of the most common line types in use. While the maximum operating temperatures of natural gas lines are at 70° C., the same temperatures are 95° C. for drinking water lines and 110° C. for heating pipes. Certainties for the functional capability of thermoplastic sealants therefore typically cannot be assumed for these and comparable applications.

A further disadvantage is the low mechanical carrying capacity of the sealants. Particularly lacquers or resins are easily damaged during transport or by incorrect handling. This also frequently results in leaks.

Moreover, the use of polyamide or epoxide resin as a sealant is limited to very specific applications.

SUMMARY OF THE INVENTION

In general, one aspect of the invention is based on the technical problem of providing a connection element, a pipe part, and a valve, in which the disadvantages known from the prior art occur not at all or at least significantly less frequently. In another aspect, the present invention includes a method in which the connection element of the type cited at the beginning may be produced without further measures.

In the connection element according to the present invention, a sealant is provided, which contains a material selected from the following group and/or consists of at least one of these materials: silicones, fluoropolymers, in particular perfluoroalkoxypolymers, epoxide resins and polyurethanes. Furthermore, the sealant may contain and/or consist of an elastomer, preferably a thermoplastic elastomer.

The specified materials for the sealant preferably each have a hardness of 10 to 110 IRHD, more preferably 30 to 90 IRHD, still more preferably 40 to 80 IRHD, and most preferably 55 to 75, these hardness specifications relating to the pure polymer material without addition of the fillers described below. The abbreviation IRHD stands for International Rubber Hardness Degree. The specified materials for the sealant preferably also have a swelling coefficient in demineralized water of 1 to 20% (m), more preferably 3 to 15% (m), and most preferably 3.5 to 12.5%, measured on 20×60×2 $mm^3$ film pieces in demineralized water at 40° C. after 48 hours.

Silicones are fundamentally known to those skilled in the art and are described, for example, in "Römpp Chemie Lexikon [Chemical Lexicon], 9th edition, 1993, pages 4168-4172." The silicones are systematically identified as polyorganosiloxanes. The use of silicones as the sealant is advantageous because silicones are temperature-stable, have long-term flexibility, are heat resistant, hydrophobic, and physiologically harmless. According to the present invention, linear polysiloxanes, branched polysiloxanes, cyclic polysiloxanes, and/or cross-linked polysiloxanes may be used. The use of silicone rubbers and silicone resins is especially preferred, because they have a high permanent heat resistance and largely temperature-independent dielectric values. The use of elastomeric silicones is also especially preferred. The production of silicones is fundamentally known to those skilled in the art and may be performed via hydrolysis and polycondensation of dialkyl dichlorosilanes, for example. Further production methods are described in "Römpp Chemie Lexikon, 9th edition, 1993, pages 4168-4172."

Fluoropolymers are fundamentally known to those skilled in the art and are described, for example, in "Römpp Chemie Lexikon, 9th edition, 1993, page 1412." The use of fluoropolymers as the sealant is advantageous because fluoropolymers are inert and are additionally distinguished by high chemical and thermal stability, good electrical insulating properties, outstanding weather resistance, anti-adhesive behavior, and nonflammability. According to the present invention, both polymers containing fluorine exclusively having carbon atoms in the main chain and also those having heteroatoms in the main chain may be used. If polymers containing fluorine exclusively having carbon atoms in the main chain are used, homopolymers and copolymers of olefinic unsaturated fluorinated monomers are especially preferred, in particular chlorotrifluoroethylene, fluorovinylsulfonic acid, hexafluoroisobutylene, hexafluoropropylene, perfluorovinylmethylether, tetrafluoroethylene, vinyl fluoride, and vinylidene fluoride. If polymers containing fluorine having heteroatoms in the main chain are used, polyfluorosilicones and polyfluoroalkoxyphosphazenes are especially preferred. The use of perfluoroalkoxypolymers is particularly preferred. The use of elastomeric fluoropolymers is also especially preferred. The production of fluoropolymers is fundamentally known to those skilled in the art and may be performed, for example, via emulsion or suspension copolymerization of tetrafluoroethylene and perfluoropropylvinylether. Further production methods are described in "Römpp Chemie Lexikon, 9th edition, 1993, page 1412."

Epoxide resins are fundamentally known to those skilled in the art and are described, for example, in "Römpp Chemie Lexikon, 9th edition, 1993, page 1196." The use of epoxide resins as a sealant is advantageous because epoxide resins are flexible, chemical-resistant, and usually cure at room temperature. The use of reaction products of epichlorohydrin with o-cresol or phenol novolaks is especially preferred according to the present invention. The use of elastomeric epoxide resins is also especially preferred. The production of epoxide resins is fundamentally known to those skilled in the art and may, for example, be performed via polyaddition of dioxirane or polyoxirane compounds with diamines or polyamines, diols or polyols, diacids or polyacids, and/or oxirans. Further production methods are described in "Römpp Chemie Lexikon, 9th edition, 1993, page 1196."

Polyurethanes are fundamentally known to those skilled in the art and are described, for example, in "Römpp Chemie Lexikon, 9th edition, 1993, pages 3575-3577." The use of polyurethanes as a sealant is advantageous because polyurethanes are chemical-resistant and have very low friction during assembly when they are moistened. The use of polyurethane resins is especially preferred according to the present invention, because they have a high drying speed and hydrolysis resistance. The use of polyurethane rubbers is also especially preferred according to the present invention, because they have a high abrasion and tearing resistance as well as outstanding oil and oxidation resistance. The use of elastomeric polyurethanes is also especially preferred. The production of polyurethanes is fundamentally known to those skilled in the art and may, for example, be performed via polyaddition of isocyanates to diols and polyols, diamines and polyamines, and/or dicarboxylic and polycarboxylic acids. Further production methods are described in "Römpp Chemie Lexikon, 9th edition, 1993, pages 3575-3577."

Elastomers and thermoplastic elastomers are fundamentally known to those skilled in the art and are described, for example, in "Römpp Chemie Lexikon, 9th edition, 1993, pages 1105-1107, 4570-4571." The use of elastomers as a sealant of the connection element according to the present invention is advantageous because elastomers may be applied easily. The use of thermoplastic elastomers is especially preferred according to the present invention, because they are easily processable. The production of elastomers is fundamentally known to those skilled in the art and may be performed, for example, via polyaddition of isocyanates to diols, diamines, and/or dicarboxylic acids. Further production methods are described in "Römpp Chemie Lexikon, 9th edition, 1993, pages 1105-1107, 4570-4571."

The previously specified materials have been proven to be advantageous for coating threads. In each case, they allow a connection to be produced which has permanent sealing properties. Because these materials are also heat resistant, they may be used in the above-mentioned applications in household technology. These are drinking water pipes, heating pipes, and natural gas lines.

The cited plastics and synthetic resins adhere very well in the thread groove of the thread, so that undesired detachment and displacement of the sealant into the external area of the screw connection, where the sealant does not unfold its sealing effect, are avoided.

The cited materials simultaneously have advantageous elasticity values. These ensure that the sealant clings to the internal and external threads of the screw connection and fills up the corresponding intermediate space comprehensively. The sealant is so resistant to mechanical strains acting on the screw connection that leaks may be prevented even over long periods of time.

The above-mentioned materials may also be preferably used as mixtures to combine their properties suitably.

The cited materials are each understood in the present case as a plastic or synthetic resin which, in addition to the particular main component, may also have further secondary components, preferably in the form of additives, to improve the relevant physical and/or chemical properties such as the adhesion in the thread groove, the elasticity, the chemical resistance, and/or the heat resistance.

Nonetheless, in one embodiment, the sealant may also solely comprise one of the cited materials or a mixture thereof. This simplifies not only the production effort, but rather also ensures that the sealant may be used more universally.

The properties of the sealant are also positively improved for the particular application by adding a suitable filler to the sealant. Fillers may particularly prevent rubbing off, crushing, and other destruction of the plastics and/or synthetic resins fulfilling the sealing function.

The filler at least partially comprises fibers. The sealant permanently bonded to the thread thus advantageously has fiber properties, which are advantageous if hemp is used, as described above.

It is preferable for the fibers to contain wool, cellulose, polyamide, carbon, glass, and/or polyimide and/or comprise at least one of these materials.

The use of wool has the advantage that wool is chemical-resistant and has friction anisotropy. The use of cellulose has the advantage that cellulose is swellable. The use of polyamide has the advantage that polyamide is stable and forms a good bond with resins/plastics. The use of carbon has the advantage that carbon is high strength and chemical-resistant. The use of glass has the advantage that glass is rigid and hygienically perfect and, in addition, forms a good bond with resin. The use of polyimide has the advantage that polyamide is high strength and chemical-resistant.

The fibers may also contain partially synthetic fibers, such as sized natural fibers. The coating of the natural materials causes better adhesion of the fibers to the sealant.

This is also true for fillers which contain silanized powders and/or primed sand. The use of these materials has the advantage that they form a good bond to the resin/plastic.

In addition, it is advantageous if the filler has felts, powders, or flocks, which may also comprise the above-mentioned materials.

The use of felt has the advantage that it may be permeated well and therefore forms a good bond to the resin/plastic. The use of powder has the advantage that it may be homogenized better in the resin/plastic than other additive geometries and is hardly damaged during screwing in. The use of flocks has the advantage that they are flexible and have a high strength in the compressed state.

In addition, it is possible to use microparticles as the filler, whose dimensions may be in the micrometer or even the submicrometer range. Very homogeneous distribution of the filler in the sealant may be achieved by the small dimensions, so that the property caused by the filler is present uniformly in the entire sealant. This is advantageous in particular for uniform sealing.

The filler may also preferably have microcapsules, which contain an additive and which burst due to the mechanical strain by friction and shearing forces upon screwing of the thread and release the additive. A physical or chemical process may thus be initiated during the use of the thread by the additive, which is first released during the screwing together.

It is preferable for the microcapsules to contain an adhesive, in particular a reactive adhesive. The adhesive may cause better adhesion of the sealant not only to the internal thread, to which the sealant has already been applied, but rather better adhesion to the screwed-on thread part may also be achieved by the adhesive.

All known adhesives come into consideration as the adhesives. These may be single-component adhesives which unfold their adhesive effect by themselves upon their release. However, one component of a dual-component adhesive may also be contained in the microcapsules, for example, which escapes from the microcapsules when the thread is screwed together and then reacts with a further component, which is either present in the sealant or escapes from the material of the thread. The endurance of the seal which is to be caused by the sealant is thus further improved.

A further alternative for the use of microcapsules is that the microcapsules have a component for foaming. Foaming of the sealant may thus be initiated upon screwing together, by which the intermediate space located between the two thread parts may be filled up even better by the sealant. For example, flaws may thus be mended, which may arise because of the mechanical strain of the sealant when the thread is screwed together.

In addition, it is advantageous independently of the use of microcapsules if the sealant itself is provided in foamed form on the thread. Greater elasticity of the sealant thus results, by which the intermediate spaces between the thread parts may be filled up better. Greater endurance of the screw connection is also achieved by the elasticity of the sealant.

A further filler which may be added to the sealant is a lubricant. It is preferable for the lubricant to have flaky particles, in particular polyolefin particles or talcum particles. Due to the lubricant, the sealant has a lower coefficient of friction, by which the screwing into the counter thread is made easier and tearing of the sealant, for example, because of adhesion phenomena on the thread flanks during screwing and possibly during unscrewing, is prevented.

A further alternative for a filler is that the sealant has chip breakers. When the two thread parts are screwed together, elongate solid threads or chips arise, which are separated out of the sealant, which must be removed in an additional work step. To prevent these long chips, the chip breaker is used. The chip breaker advantageously has solid microparticles having a low adhesion to the material of the sealant, in particular containing polytetrafluoroethylene (PTFE), polyolefins, and layered silicates.

In a further embodiment of the sealant, it has at least two layers, which differ in at least one property. The sealant may thus be implemented on one hand in the area of the contact surface of the thread so that a good adhesion is achieved to the thread surface. On the other hand, the sealant may be implemented in the area of the interaction with the other thread part in regard to the chip-breaking properties, the elasticity properties, and/or the coefficient of friction, for example.

In a first embodiment, the at least two layers may have different hardnesses, both alternatives resulting therefrom each having their advantages.

It is preferable for the layer proximal to the thread, i.e., the base layer, to be harder than the layer facing away from the thread, i.e., the cover layer. A hard base layer of the sealant thus causes better local fixing on the thread surface. A soft, more flexible cover layer increases the sealing effect to the counter thread. The base layer preferably has a hardness of 50 to 100 IRHD, more preferably 60 to 90 IRHD, especially approximately 80 IRHD. The cover layer preferably has a hardness of 20 to 70 IRHD, more preferably 40 to 60 IRHD, especially approximately 50 IRHD. The abbreviation IRHD stands for International Rubber Hardness Degree.

In contrast, if the layer proximal to the thread is softer than the layer facing away from the thread, a lower torque may thus be achieved because of a lower friction between the thread parts.

One possible embodiment of the layered construction of the sealant may thus comprise the layer proximal to the thread having fillers for setting the hardness and the layer facing away from the thread having fillers in the form of chip breakers and/or lubricants.

The previously described layered construction of the sealant may, on one hand, comprise the at least two layers each being implemented as separate layers, which are bonded to one another, however. However, it may be especially advantageous if the at least two layers have transitions to one another in the form of gradients. In this case, a more homogeneous construction results due to the gradient formation, so that at least two layers do not detach from one another, if shear forces occur during screwing together of the thread parts, for example.

The sealant has been explained above in regard to its composition in detail on the basis of various exemplary embodiments. A further aspect of the present invention comprises the way in which the sealant is made continuously loadable and stable after the application to the thread. For this purpose, it is suggested that the sealant be cured by temperature increase or by irradiation, in particular UV irradiation.

In particular, the sealant has a plastic or synthetic resin curable at a temperature greater than the operating temperature of the line. This plastic or synthetic resin has a sufficient elasticity in the cured state to fulfill the requirements on the seal properties over a long period of time.

Operating temperature is understood here on one hand as a generally valid, maximum operating temperature and on the other hand as an operating temperature which is not exceeded under typical circumstances in operation or is not to be exceeded for whatever reason.

Generally valid maximum operating temperatures are codified in particular for natural gas, drinking water, and hot water lines. A maximum operating temperature may also be codified in other cases, which may have to do with the carrying capacity of the material of the line or with safety technology considerations.

Finally, there is also the case in which higher temperatures would be permissible, but a maximum temperature is not and/or could not be exceeded because of existing boundary conditions. Lines of this type are used in particular in the chemical industry, electrical engineering, and similar branches.

The temperatures at which the sealant is cured are strongly dependent on the particular composition of the sealant, the composition in turn being able to be determined by manifold influencing factors. Inter alia, the operating temperature of the line, its rated pressure, the chemical resistance of the line, and the like are to be considered here. However, sealants which cure at a temperature between 130° C. and 450° C. for approximately 1 minute to 20 minutes or also up to 90 or 120 minutes are preferably used here.

The sealants are then not subject to any significant changes of a physical or chemical nature in normal operation, i.e., if the temperature does not exceed the maximum operating temperature. This would similarly be conceivable at most at temperatures in the range of the curing temperatures. However, these temperatures are never reached during operation according to the guidelines, so that it is ensured for the connection element that the sealant permanently has high elasticity, which is decisive for the long-term sealing effect.

The sealant is preferably cured at a temperature which is at least 10° C., preferably 20° C., more preferably 50° C. above the maximum temperature to be expected in operation and/or permissible temperature of the line.

Furthermore, an advantage of the sealant is that it may simultaneously be used in broad temperature ranges, without the physical and chemical properties of the sealant changing due to thermal effects. This is true in particular for the cited permanent elasticity. In addition, it is advantageous if the sealant material also has a high chemical resistance to manifold media and if the sealant material adheres well to many materials which are not to be coated by other plastics.

A further measure for improving the bond between the thread and the sealant comprises pretreating the surface of the thread. On one hand, the pretreatment may comprise roughening the surface of the thread by particle jets or pickling. On the other hand, the surface of the thread may be pretreated using an adhesion promoter or a primer. In all examples described, better adhesion of the sealant to the material of the thread is achieved by the pretreatment.

Fundamentally, all connection elements known from the prior art which may be part of a screw connection come into consideration as the connection element. It thus fundamentally also does not play a role which type of thread is provided in the connection element, or whether the thread is implemented having one or multiple grooves. As a result, these differences are not discussed further, without this amounting to a restriction.

The sealant allows reliable sealing of tapered, trapezoidal, round, flat, or other typical threads. A cylindrical or conical thread may also be used depending on the application. In conical threads, the tightness of an otherwise metallic seal may also be improved by the use of the sealant and/or the force required for tightening the screw connection may be reduced with identical sealing, because the sealant may be deformed much more easily than the metal of the internal or external thread.

The decision as to which thread is finally used may essentially be supported on the criteria already cited without consideration of the seal. Even plastic threads may be used.

The sealing of the screw connection per se occurs via the squeezing of the sealant into the thread grooves of the screw connection. Upon this squeezing, the sealant builds up restoring forces, which counteract unintentional loosening of the screw connection.

Moreover, the connection element may already be provided with the sealant long before its use. Damage to the sealant by storage over a longer period of time or by mechanical effects during transport or during screwing together is reliably prevented because of the resistance capability of the sealant. The production of the connection element and the application of the sealant are preferably performed immediately sequentially in a joint production process. The outlay for applying the sealant may be minimized by the use of appropriate machine technology and the production of higher piece counts and faulty coating on location may be prevented.

The user then no longer has to concern himself with the seal during production of a screw connection, but rather may simply remove already precoated connection elements from a stockpile and screw them together without a further intermediate step. No special care is required either. It is typically even possible without problems to loosen a screw connection already produced and screw it together again. The seal of the screw connection is thus not disadvantageously affected, in contrast to the thread seals known from the prior art.

In addition, it may be advantageous if the coated thread is wetted using a liquid, so that lower friction forces must be overcome during screwing in. Water and also greases or oils come into consideration as the liquid. If the thread is used in drinking water lines, it is necessary, of course, for the liquid to be compatible with drinking water. In this case, in particular food greases or oils come into consideration in addition to water.

The area of the thread and/or the thread groove which carries the sealant is described here by the number of revolutions of the thread groove. In other words, one complete revolution is the length of the thread groove which it requires to revolve 360° around the spine or core of the thread. The distance between starting point and end point of a complete revolution lengthwise to the thread corresponds to the pitch of the thread. If the thread is known for a given connection element, it results for one skilled in the art without further measures from the specification formulated in revolutions where sealant is or is not present.

In regard to the application of the sealant to the thread, it is preferable if the thread is an external thread, it also being possible, of course, to provide the sealant in an internal thread. However, an increased production outlay must be accepted for this purpose. The effect of the sealant is identical in both cases in the final analysis.

In a further embodiment, the sealant fills up the thread groove essentially completely. In other words, this means that the thread groove, which is externally delimited by the ends of the thread flanks, is filled up at least 80%, preferably at least 90%. However, it is alternatively also possible that the thread groove is overfilled, i.e., seal material projects beyond the outer ends of the thread flanks. In particular, approximately 10% to 20% more sealant is present than the thread groove may accommodate when completely filled. Fundamentally, it is preferable to provide more sealant the larger the thread diameter.

The appropriate quantity of sealant then ensures a satisfactory seal independently of the employed thread of the connection element and the corresponding counter thread. Of course, the sealant must have sufficient elasticity. The elastic deformation upon screwing together may nonetheless possibly have a plastic deformation superimposed. In addition, detachment of the sealant by the forces arising during screwing together may be precluded.

However, it is also fundamentally conceivable that the thread groove is not essentially completely filled. The thread groove is preferably filled just enough that the sealant quantity and/or the sealant volume in the thread groove after the screwing together with a counter thread is sufficient to fill up the intermediate space between the internal and external threads of the screw connection thus formed in the area of the sealant section. The required sealant volume may be determined by one skilled in the art without further measures if he has established the model and size of the two threads to be screwed together.

According to a further embodiment of the present invention, the sealant may be applied close to the contour in the thread groove. Application close to the contour is understood as essentially uniform coating of the surface of the thread. One may also refer to a uniform topcoat of the thread by the material of the sealant. This does not relate to a more or less constant thickness of the coating, but rather to all thread parts being coated. This is because, in contrast to filling up the thread groove, which has been explained at another point of this description, with application of the coating close to the contour, also the thread peaks and not only the thread flanks and the thread base are provided with the sealant. However, it must be ensured that when the thread parts are screwed together, a seal between the thread parts over at least one complete revolution of the thread is ensured by the sealant.

In order that the screwing together of the connection elements is not made unnecessarily difficult, in another embodiment, the sealant is provided in the thread groove over up to ten or even more complete revolutions of the thread groove. The optimum number of revolutions is a function of the individual case here, of course. However, it is typically sufficient if the sealant is provided over two to five complete revolutions in the thread groove.

The handling of the connection element may alternatively or additionally also be improved in that the thread groove on one screwing-in end has no sealant over a complete revolution of the thread groove. This makes it easier to screw in the connection element and reduces the danger of jamming, while the connection elements of a screw connection are engaged with one another. Screwing in is made even easier if the first two or even three complete revolutions of the thread groove from the screwing-in end are free of sealant. Fundamentally, of course, a sealant-free area of arbitrary length may be provided on the screwing-in end. However, screwing in is not made noticeably easier from a certain length of this area.

To ensure that the sealant is not pressed outward out of the screw connection, which may be undesirable for visual reasons, inter alia, in one embodiment of the connection element, a complete revolution of the thread groove which is free of sealant is provided on the end of the thread opposite to the screwing-in end. If very high requirements are placed on the visual appearance of the screw connection, it may be expedient if the thread groove is free of sealant over two or even three complete revolutions of the thread groove. The number of sealant-free revolutions of the thread groove may fundamentally be increased further, but this may result in an overall longer thread length in the specific case.

In a further embodiment of the present invention, a radially excavated channel is provided in the thread and the channel is provided with sealant. It is ensured by the radial channel that a larger volume is available to the sealant, within which it may be displaced or compressed. In addition, the channel makes it possible that the counter thread is enclosed with sealant over at least one complete revolution in any case and direct contact of the two thread parts without sealant between the contact surfaces is avoided. The reliability of the seal between the thread parts is thus improved.

Alternatively or additionally, in a further embodiment, one or more axially excavated channels may be provided in the thread, which are provided with sealant. The axial channels cut through the thread grooves, which are also filled up with sealant in one of the ways described above. The channels are also used here as a sealant reservoir.

The channels were described above as radially or axially excavated channels. However, it is also possible in the scope of the present invention to provide channels which run at an angle to the radial orientation and at an angle to the axial orientation. Diagonally running channels of this type may be applied in arbitrary form and have the same properties and advantages as were described above for the radial and/or axial channels.

The technical problem described above is also solved according to the present invention by a connection element for producing a fluid-tight screw connection of a line, the connection element having a thread. To solve the problem, at least one radially excavated channel is provided in the thread, the channel being provided with sealant.

According to this embodiment, which is also part of the present invention, one or more thread grooves are not provided with sealant, but rather the radial channel, which finally cuts through the thread grooves in the axial direction, is provided with the sealant. The sealant in the radially excavated channel may be may be compared to a gasket, which is not situated loosely in the channel, but rather is permanently bonded to the channel.

As already explained in detail above, the sealant contains a material selected from the following group and/or comprises at least one of these materials: silicones, fluoropolymers, in particular perfluoroalkoxypolymers, epoxide resins, and polyurethanes. The sealant may also contain and/or comprise an elastomer, preferably a thermoplastic elastomer.

In addition to the possibility that only the radially excavated channel is provided with sealant, the radially excavated channel and surrounding thread grooves of the thread may also be provided with sealant. The embodiment already described above thus results.

Further properties and advantages of this alternative embodiment of the connection element result from the previously specified description of the features of the various exemplary embodiments. To avoid repetitions, reference is made to these examples.

In the pipe part and the valve according to the present invention, one attachment end is a connection element of the preceding type. However, two or more connection elements may also be provided in the pipe part or the armature. In the case of a pipeline assembled from pipe parts, however, it is to be ensured that each screw connection of the pipeline is a connection element having a sealant which has been cured at a temperature greater than the maximum operating temperature.

The technical problem described above is also solved according to the present invention by a method for producing a connection element, in which the thread and/or the radial channel of the connection element is at least partially coated using a sealant, and in which the sealant is subsequently heated or irradiated for curing. A tight bond to the thread is produced by the curing of the sealant, so that the sealant does not detach from the service of the thread when screwed together with a further thread part, and thus allows a permanent seal between the two thread parts.

In an embodiment of the method, the sealant is preferably heated to a temperature greater than the operating temperature of the line for curing. The connection elements may thus be produced easily and in a large piece count.

For example, if a silicone is used as the sealant, the curing temperatures may be in the range of 170° C., the treatment time being in the range from 2 to 10 minutes, preferably 5 minutes. If a PFA is used as the sealant, the curing temperatures may be in the range from 280° C. to 320° C., the treatment time being in the range from 5 minutes to 15 minutes, preferably 10 minutes. The above-mentioned numeric values are to be understood solely as examples and do not restrict the present invention.

In a further embodiment, the thread or at least a thread part may also be preheated. The surface of the thread part is thus better prepared for the application of the sealant.

Furthermore, means may be used which restrict the thread area to which the sealant is applied to a predetermined partial area of the thread. Thus, revolutions of the thread groove at the screwing-in end and/or at the end of the thread opposite thereto may be left exposed without further measures and the sealant may only be provided in a middle area.

As described above, there are preferred treatment temperature ranges and treatment times for the exemplary usable sealant made of silicone or PFA, using which they may be processed in the scope of the method according to the present invention.

BRIEF DESCRIPTION OF THE DRAWINGS

In the following, the present invention is explained in greater detail on the basis of an exemplary embodiment with reference to the attached drawings. In the drawings

DESCRIPTION

Figure 1:
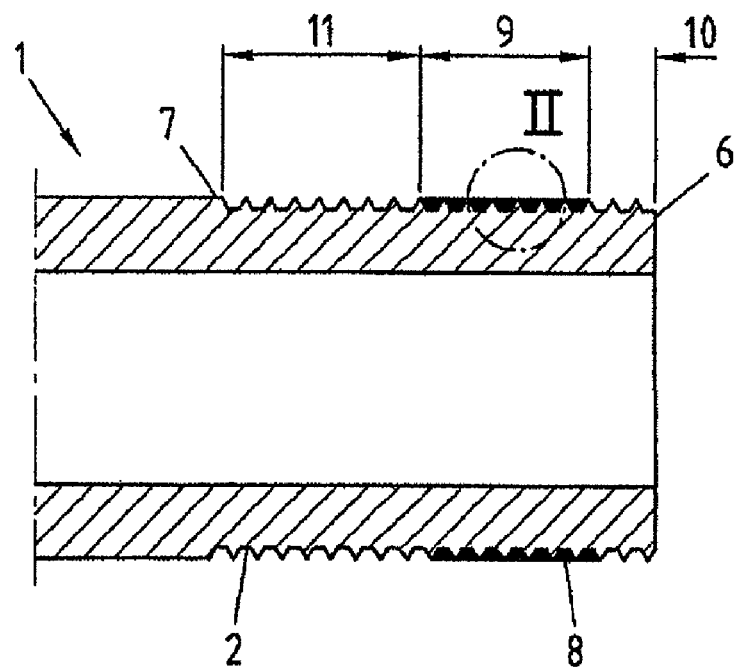
FIG. 1 shows an exemplary embodiment of a connection element in a sectional illustration.

FIG. 1 shows a connection element 1 having a cylindrical external thread. The thread 2 is formed by a thread groove 3, which is formed by a thread base 4 and two thread flanks 5 adjoining on both sides of the thread base 4. The thread groove 3 extends along the entire thread 2 from the screwing-in end 6 to the end 7 of the thread 2 situated opposite.

A sealant 8 is provided in a partial section of the thread groove 3 and/or the thread 2. The sealant 8 adheres solidly in the thread groove 3 of the thread 2 and presses over essentially the entire area of the thread base 4 and the thread flanks 5. The partial section provided with the sealant 8, the sealant section 9, extends over seven complete revolutions of the thread groove in the exemplary embodiment shown in FIG. 1.

Although sealant having complete coverage is shown in FIGS. 1 through 4, complete coverage of the sealant is not absolutely necessary. However, the bonding forces between the sealant and the thread groove are especially great in this case. With good flow properties of the sealant in the moment of application, complete coverage may also be achieved without further measures. Only regional and/or sectional coverage of the sealant is fundamentally harmless, however, as long as the binder per se adheres solidly enough in the thread groove that undesired detachment of the sealant does not occur.

In addition, the sealant section 9 does not adjoin the screwing-in end 6 or the opposite end 7 of the thread 2. Rather, a screwing-in section 10, which extends over three complete revolutions of the thread groove, is situated between the screwing-in end 6 of the thread 2 and the sealant section 9.

On the side of the sealant section 9 facing away from the screwing-in end 6, an end section 11, which is free of sealant 8 like the screwing-in section 10, extends up to the end 7 of the thread 2. In the exemplary embodiment from FIG. 1, this end section 10 extends over a length of eight complete revolutions of the thread groove.

The sealant section 9, the screwing-in section 10, and the end section 11 may also have other dimensions, however. It is important, however, that the sealant 8 is provided along at least one complete revolution of the thread groove and at most over a number of revolutions which just still allow a fluid-tight screw connection to be produced using a previously established force application. To reduce the thread length, the screwing-in section 10 and the end section 11 may be dispensed with. In addition, the sealant section 9 may turn out to be very short, because the restoring forces of the sealant prevent unintentional loosening of the screw connection even if external and internal threads are only engaged with one another over a short area of the thread groove.

Figure 2:
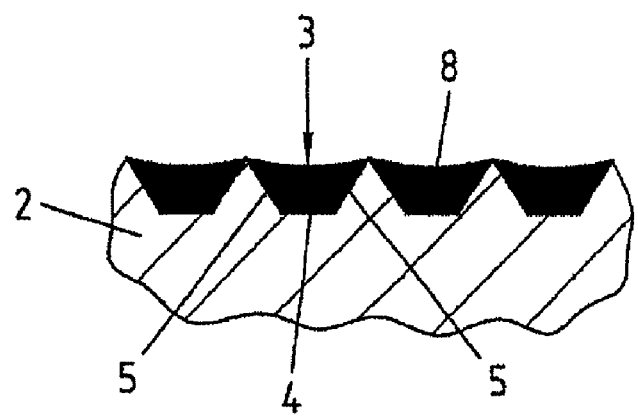
FIG. 2 shows detail II from FIG. 1 in an enlarged schematic illustration.

FIG. 2 shows that in the exemplary embodiment from FIG. 1, the thread groove 3 is filled up essentially completely, i.e., approximately up to the entire height of the thread flanks 5, in the area of the sealant section 9. Furthermore, the thread is only schematically indicated in FIG. 2, because fundamentally every known thread type may be used.

Figure 3:
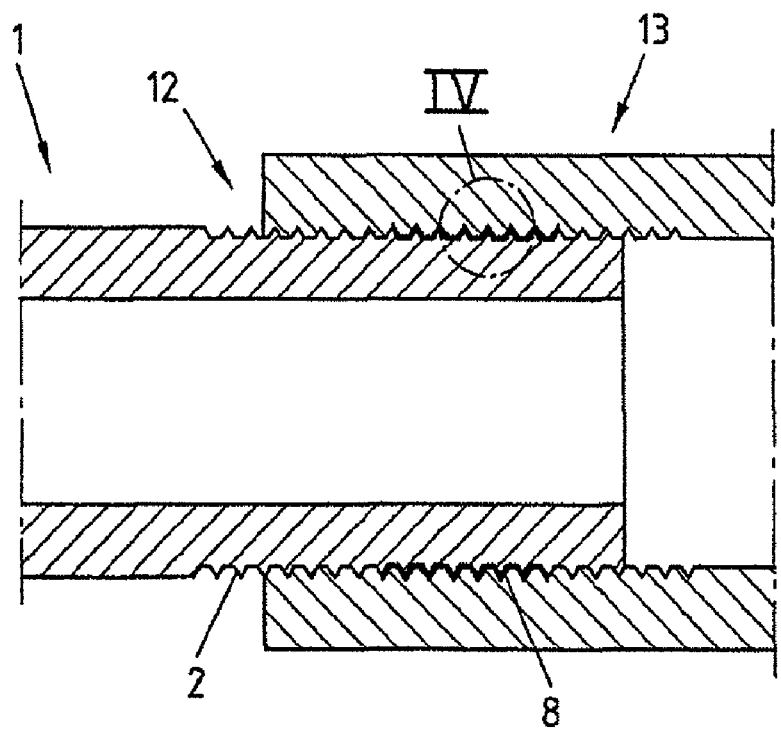
FIG. 3 shows the exemplary embodiment of the connection element from FIG. 1 as part of a screw connection.

FIG. 3 shows the exemplary embodiment from FIG. 1, as a part of a screw connection 12 together with a sleeve 13 having a cylindrical internal thread. As shown in FIG. 3, the sealant 8 is not sheared off and pushed in front of the screwing area per se in spite of the shear forces arising during screwing. Rather, the sealant 8 remains essentially in location in relation to the connection element 1. The sealant 8 is only squeezed between the internal thread and the external thread. If the intermediate space between the internal thread and the external thread is very small, it may be that the sealant 8 expands into neighboring thread grooves. Alternatively or additionally, a part of the sealant 8 may also be sheared off during screwing and possibly in turn ensure a seal of the screw connection 12 in the end section 11. However, because of the screwing-in section 10 and the end section 11, the sealant 8 does not protrude on either the screwing-in end 6 of the connection element 1 or the screwing-in end of the sleeve 13.

Figure 4:
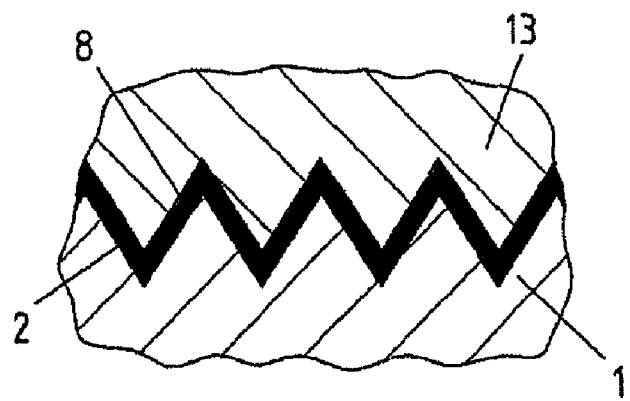
FIG. 4 shows detail IV from FIG. 3 having a tapered thread in an enlarged schematic illustration.

FIG. 4 shows an enlarged view of how the sealant 8 fills up the intermediate space between the external thread of the connection element 1 and the internal thread of the sleeve 13 fluid-tight by squeezing. In the embodiment shown, a tapered thread is provided, which has a linear thread base. The thread groove of the thread may thus, of course, also essentially be formed and/or delimited solely by the thread flanks.

Figure 5:
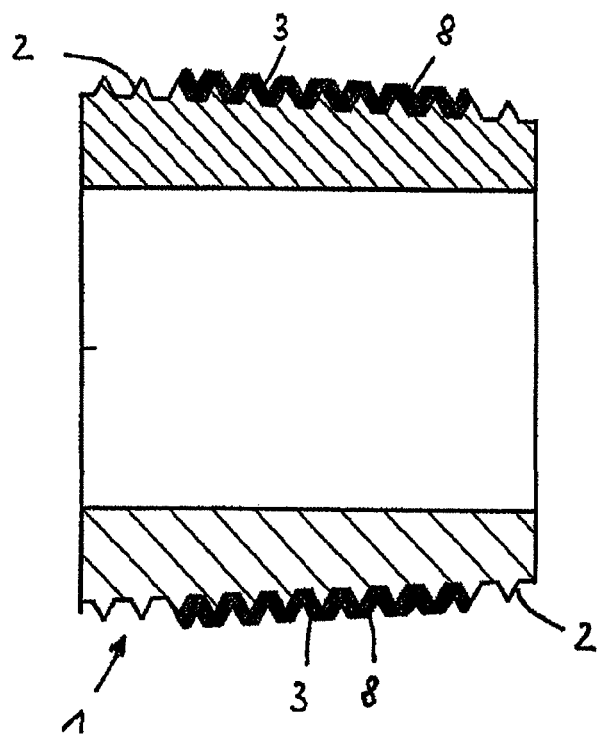
FIG. 5 shows an exemplary embodiment of a connection element having a conical thread, which has been provided with sealant close to the contour.

FIG. 5 shows a connection element 1 having a conical thread 2. In contrast to the previously illustrated exemplary embodiments, in the present case, the sealant 8 is applied close to the contour in the thread groove 3. An application close to the contour is understood to mean that the sealant 8 is applied in an essentially uniform thickness as a layer to the thread 2 and it is not important what degree of filling the thread grooves 3 have. Upon screwing together with a counter thread, the sealant 8 is compressed in a similar way as described above and results in a permanent seal of the two thread parts screwed together.

Figure 6:
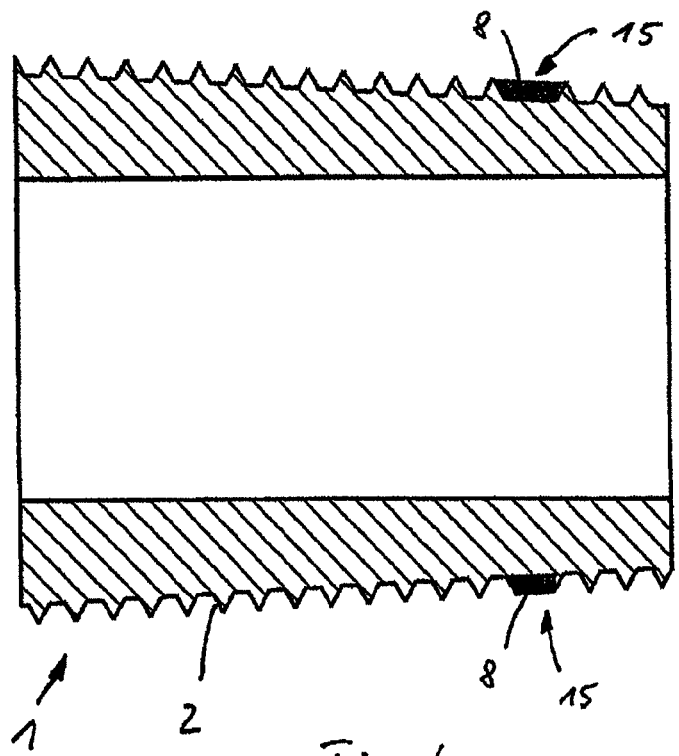
FIG. 6 shows an exemplary embodiment of a connection element having a conical thread, which has been provided with a radially excavated channel.

FIG. 6 shows a further exemplary embodiment of a connection element 1 according to the present invention, which is also provided with a conical thread 2. A radially excavated channel 15 is provided in the present case, which cuts through the internal thread 2 in the axial direction. As shown in FIG. 6, only the channel 15 is provided with sealant 8. The effect of a gasket thus results, which is bonded solidly to the thread and into which the counter thread cuts and thus causes the sealing effect.

A thread having a channel 15 is shown in. FIG. 6. Of course, it is additionally possible to provide multiple radially excavated channels 15 along the thread 2.

As previously described, in the exemplary embodiment shown in FIG. 6, only the channel 15 is provided with sealant. In a further embodiment, which is not shown in the figures, thread grooves situated on at least one of the two sides of the channel may additionally also be provided with the sealant. The two variants are thus combined with one another, the radial channel 15 being used as a sealant reservoir.

Figure 7:
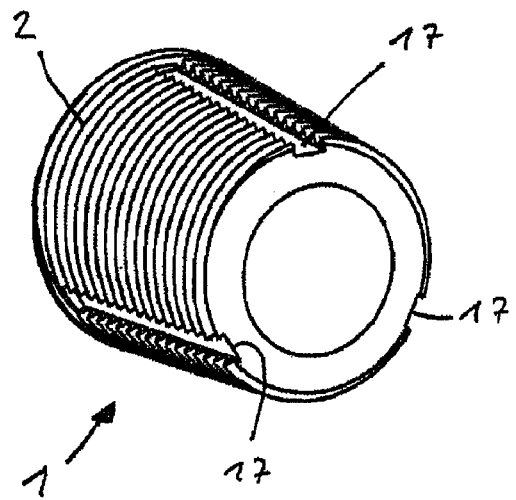
FIG. 7 shows an exemplary embodiment of a connection element having a conical thread, which is provided with an axially excavated channel, in a perspective illustration.
Figure 8:
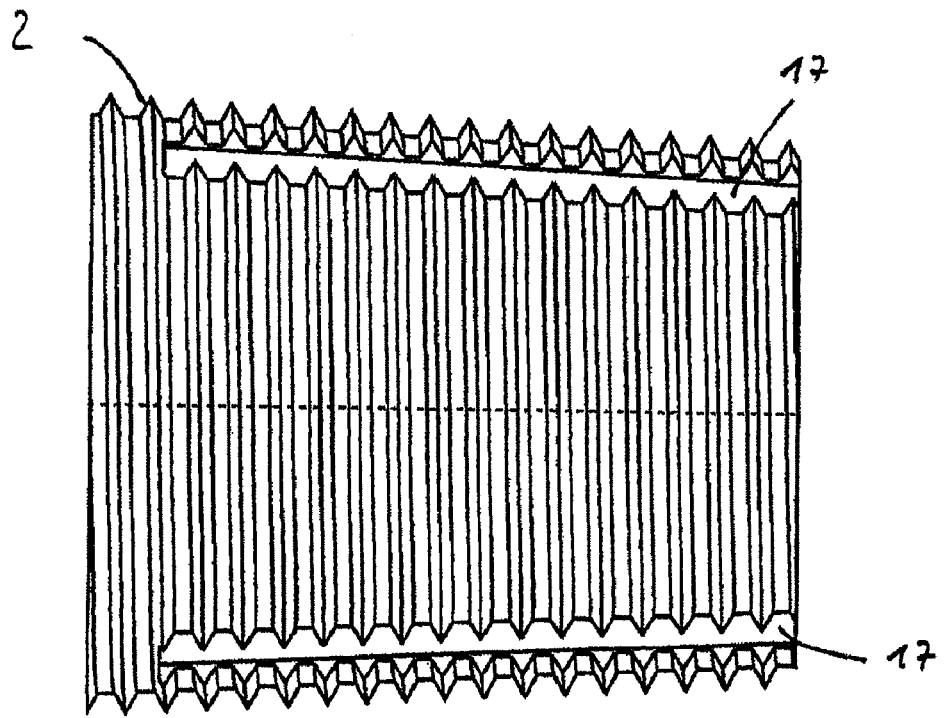
FIG. 8 shows the exemplary embodiment illustrated in FIG. 7 in cross-section.

FIGS. 7 and 8 show further exemplary embodiments of a connection element 1 according to the present invention having a conical internal thread 2. In contrast to the exemplary embodiment explained on the basis of FIG. 6, the connection element 1 has three axially excavated channels 17 in the thread 2. The channels 17 are illustrated without a coating in FIGS. 7 and 8 to illustrate the geometry. However, according to the present invention, the channels 17 are at least partially provided with sealant 8 and are thus also used as a sealant reservoir. For a complete seal between two thread parts, however, it is necessary for at least one complete thread groove to be provided with sealant, as explained above on the basis of FIGS. 1 through 4.

The invention claimed is:

1. A connection element for producing a fluid-tight screw connection of a line,
having a thread,
having a thread groove delimited by a thread base and neighboring thread flanks,
having a sealant situated in the thread groove over at least one complete revolution of the thread groove,
an adhesive bond being implemented between the sealant and the thread groove,
wherein the sealant includes at least one material selected from the group consisting of: silicones, fluoropolymers, epoxide resins, and polyurethanes, the sealant has a filler, and the filler has fibers,
wherein the adhesive bond extends at least over essentially the entire area of the thread groove over at least one complete revolution of the thread groove before the connection element is used for producing a fluid-tight screw connection of a line, and
wherein the filler has microcapsules or the sealant has chip breakers.

2. The connection element according to claim 1, wherein the sealant includes a mixture of at least two of the materials selected from the group consisting of silicones, fluoropolymers, epoxide resins, and polyurethanes.

3. The connection element according to claim 1, wherein the fibers include wool, cellulose, polyamide, carbon, glass, and/or polyimide.

4. The connection element according to claim 3, wherein the fibers contain sized natural fibers, silanized powder, or primed sand.

5. The connection element according to claim 1, wherein the filler has felt parts, powders, or flocks.

6. The connection element according to claim 1, wherein the filler has microparticles.

7. The connection element according to claim 1, wherein the microcapsules contain an adhesive.

8. The connection element according to claim 1, wherein the microcapsules have a component for foaming.

9. The connection element according to claim 1, wherein the sealant is provided on the thread in foamed form.

10. The connection element according to claim 1, wherein the sealant has a lubricant.

11. The connection element according to claim 10, wherein the lubricant has flaky microparticles.

12. The connection element according to claim 1, wherein the chip breaker has solid microparticles having a low adhesion to the material of the sealant.

13. The connection element according to claim 1, wherein the sealant has at least two layers, which differ in at least one property.

14. The connection element according to claim 13, wherein the at least two layers have different hardnesses.

15. The connection element according to claim 14, wherein the layer proximal to the thread is harder than the layer facing away from the thread.

16. The connection element according to claim 14, wherein the layer proximal to the thread is softer than the layer facing away from the thread.

17. The connection element according to claim 13, wherein the layer proximal to the thread has fillers for setting the hardness, and the layer facing away from the thread has fillers in the form of chip breakers and/or lubricant.

18. The connection element according to claim 13, wherein the at least two layers have transitions in the form of gradients.

19. The connection element according to claim 1, wherein the sealant is cured by temperature increase or by irradiation.

20. The connection element according to claim 19, wherein the sealant has a plastic curable at a temperature greater than the operating temperature of the line.

21. The connection element according to claim 1, wherein the surface of the thread is pretreated to improve the bond to the sealant.

22. The connection element according to claim 21, wherein the surface of the thread is pretreated by particle jets or pickling.

23. The connection element according to claim 22, wherein the surface of the thread is pretreated using an adhesion promoter or a primer.

24. The connection element according to claim 1, wherein the thread is an external thread.

25. The connection element according to claim 1, wherein the sealant substantially fills up the thread groove, or the thread groove is overfilled.

26. The connection element according to claim 1, wherein the sealant is applied close to the contour in the thread groove.

27. The connection element according to claim 1, wherein the sealant is provided in the thread groove over two to ten complete revolutions of the thread groove.

28. The connection element according to claim 1, wherein the sealant is provided in the thread groove over two to five complete revolutions of the thread groove.

29. The connection element according to claim 1, wherein the thread groove is free of sealant on a screwing-in end of the thread over at least one complete revolution of the thread groove.

30. The connection element according to claim 1, wherein the thread groove is free of sealant on the end of the thread opposite to the screwing-in end over at least one complete revolution of the thread groove.

31. The connection element according to claim 1, wherein at least one radially excavated channel is provided in the thread, and the at least one channel is provided with sealant.

32. The connection element according to claim 1, wherein one or more axially excavated channels are provided in the thread, and the channels are provided with sealant.

33. A pipe part for a fluid-tight pipeline, having at least two attachment ends, wherein one attachment end has a connection element according to claim 1.

34. A valve for a fluid-tight connection, having at least one attachment end, wherein the at least one attachment end has a connection element according to claim 1.

35. A method for producing a connection element according to claim 1, wherein the thread of the connection element is at least partially coated by a sealant, and, the sealant is subsequently heated or irradiated for curing.

36. The method according to claim 35, wherein the sealant is heated to a temperature greater than operating temperature of a line for receiving the connection element for curing.

37. The method according to claim 36, wherein a silicone is used as the sealant, which is treated at a temperature in the range of 170° C. over a period of time of 2 to 10 minutes.

38. The method according to claim 36, wherein a perfluoroalkoxy (PFA) is used as the sealant, which is treated at a temperature in the range from 280° C. to 320° C. over a period of time of 5 to 15 minutes.

39. A connection element for producing a fluid-tight screw connection of a line, having a thread, wherein a radially excavated channel is provided in the thread, and the channel is provided with sealant, the sealant includes at least one material selected from the group consisting of: silicones, fluoropolymers, epoxide resins, and polyurethanes, the sealant has a filler, and the filler has fibers.

40. The connection element according to claim 39, wherein the radially excavated channel and surrounding thread grooves of the thread are at least partially provided with sealant.

41. The connection element according to claim 39, wherein the sealant includes a mixture of at least two of the materials selected from the group consisting of silicones, fluoropolymers, epoxide resins, and polyurethanes.

42. A method for producing a connection element according to claim 39, wherein the radial channel of the connection element is at least partially coated by a sealant, and, the sealant is subsequently heated or irradiated for curing.

43. A connection element for producing a fluid-tight screw connection of a line,
having a thread,
having a thread groove delimited by a thread base and neighboring thread flanks,
having a sealant situated in the thread groove over at least one complete revolution of the thread groove,
an adhesive bond being implemented between the sealant and the thread groove,
wherein the sealant includes at least one material selected from the group consisting of: silicones, fluoropolymers, epoxide resins, and polyurethanes, the sealant has a filler, and the filler has fibers,
wherein the adhesive bond extends at least over essentially the entire area of the thread groove over at least one complete revolution of the thread groove before the connection element is used for producing a fluid-tight screw connection of a line, and
wherein the filler has microcapsules and the sealant has chip breakers.

* * * * *